(12) United States Patent
Iida et al.

(10) Patent No.: US 7,361,120 B2
(45) Date of Patent: Apr. 22, 2008

(54) CONTROL OF LOCK-UP CLUTCH

(75) Inventors: Toshiji Iida, Fuji (JP); Hiroshi Sekiya, Fuji (JP); Morimasa Yamawaki, Fuji (JP); Tatsuya Imamura, Fuji (JP); Koji Dohi, Fuji (JP); Kouji Saitou, Fuji (JP)

(73) Assignee: Jatco Ltd, Shizuoka (JP)

( * ) Notice: Subject to any disclaimer, the term of this patent is extended or adjusted under 35 U.S.C. 154(b) by 180 days.

(21) Appl. No.: 11/239,630

(22) Filed: Sep. 30, 2005

(65) Prior Publication Data

US 2006/0094564 A1 May 4, 2006

(30) Foreign Application Priority Data

Oct. 1, 2004 (JP) .............................. 2004-289916

(51) Int. Cl.
*F16H 61/58* (2006.01)

(52) U.S. Cl. ............................. 477/65; 477/53; 477/62; 477/64; 477/83; 477/84; 477/169; 477/175; 477/180; 477/181; 192/3.3; 192/3.31

(58) Field of Classification Search ................ 477/53, 477/62, 64, 65, 83–85, 169, 174, 175, 180, 477/181; 192/3.3, 3.31

See application file for complete search history.

(56) References Cited

U.S. PATENT DOCUMENTS

| 5,332,073 | A | | 7/1994 | Iizuka | |
|---|---|---|---|---|---|
| 5,733,223 | A | * | 3/1998 | Matsubara et al. | 477/175 |
| 5,752,895 | A | * | 5/1998 | Sugiyama et al. | 477/169 |
| 6,860,834 | B2 | | 3/2005 | Segawa et al. | |
| 6,942,598 | B2 | * | 9/2005 | Kondo et al. | 477/169 |
| 7,003,388 | B2 | * | 2/2006 | Nakamura | 701/67 |
| 7,195,581 | B2 | * | 3/2007 | Segawa et al. | 477/180 |
| 2002/0077218 | A1 | * | 6/2002 | Segawa et al. | 477/176 |
| 2005/0261111 | A1 | * | 11/2005 | Kurogo et al. | 477/169 |

FOREIGN PATENT DOCUMENTS

| JP | 4-224361 | 8/1992 |
|---|---|---|
| JP | 9-242865 | 9/1997 |
| JP | 2004-124969 A | 4/2004 |

* cited by examiner

*Primary Examiner*—David D. Le
(74) *Attorney, Agent, or Firm*—Foley & Lardner LLP

(57) ABSTRACT

A lock-up clutch control device which controls a lock-up clutch (6) provided in a torque converter (5) interposed between an engine (3) and a transmission (4) used with a vehicle, is disclosed. The lock-up clutch control device has a differential pressure generating device (7,8), a vehicle speed sensor (13), a throttle valve opening sensor (14), an transmission input shaft rotation speed sensor (16), engine torque detection means (2), and a controller (1). The controller (1) determines, based on the detected vehicle speed (VSP) and the detected throttle valve opening (TVO), whether or not a control region of a torque converter is a converter region wherein control is performed to disengage the lock-up clutch. When the control region of the torque converter is not the converter region, the controller (1) determines whether or not the control region of the torque converter is a slip control region wherein control is performed to make the lock-up clutch slip, based on the detected input shaft rotation speed (Npri) of the transmission and the detected engine torque (Te). When the control region of the torque converter is the slip control region, the controller commands the differential pressure generating device (7,8) to cause a slip of the lock-up clutch (6).

6 Claims, 4 Drawing Sheets

| LOCK-UP ON/OFF LINE / SLIP PERMISSION/PROHIBITION LINE | CONVERTER REGION OR NOT | |
|---|---|---|
| | CONVERTER REGION | LOCK-UP/SLIP CONTROL |
| SLIP | CONVERTER REGION | SLIP |
| LOCK-UP | CONVERTER REGION | LOCK-UP |

CONTROL OF LOCK-UP CLUTCH

FIELD OF THE INVENTION

This invention relates to a control device that controls a lock-up clutch of a torque converter.

BACKGROUND OF THE INVENTION

In a torque converter provided with a lock-up clutch, control of the front/back differential pressure (lock-up differential pressure) of the lock-up clutch engages and disengages the lock-up clutch. When the torque converter shifts from a converter state to a lock-up state, the lock-up differential pressure may gradually increase from a predetermined initial differential pressure. Namely, the torque converter may shift from the converter state to the lock-up state via a slip state. In the converter state, the lock-up clutch is disengaged, in the slip state, the lock-up clutch slips, and in the lock-up state, the lock-up clutch is fully engaged.

Tokkai 2004-124969 published by the Japan Patent Office in 2004 discloses control of a lock-up clutch wherein lock-up is performed from a low vehicle speed and, as a result, fuel consumption is improved. This prior art relates to lock-up control in the manual mode of a continuously variable transmission. The controller which performs lock-up control has a look-up map (or look-up table) specifying, in relation to a vehicle speed VSP and throttle valve opening TVO, a region where lock-up control is performed. Furthermore, a booming noise generation region, which is located on low vehicle speed side, is specified in this map. In order that the controller can prevent generation of booming noise, slip control is performed to slip the lock-up clutch in the booming noise generation region.

Here, booming noise is a noise due to an engine torque variation being transmitted to the continuously variable transmission from the engine via the lock-up clutch, and is generated in the passenger compartment.

SUMMARY OF THE INVENTION

However, in the ordinary mode (except the manual mode) of the continuously variable transmission, since the relation between the vehicle speed VSP and a turbine rotation speed Npri of the torque converter (output rotation speed from the torque converter) varies with the throttle valve opening TVO as shown in FIG. 6, correctly specifying the slip control region which performs slip control to prevent generation of booming noise requires a complex calculation.

It is therefore an object of this invention to easily specify the slip control region where slip control is performed to prevent generation of booming noise, and precisely perform slip control.

In order to achieve the above object, this invention provides a lock-up clutch control device which controls a lock-up clutch provided in a torque converter interposed between an engine and a transmission used with a vehicle. The lock-up clutch control device comprises: a differential pressure generating device which engages, causes a slip of or disengages the lock-up clutch by adjusting the differential pressure supplied to the lock-up clutch; a vehicle speed sensor which detects a vehicle speed; a throttle valve opening sensor which detects an opening of a throttle valve which adjusts an air flowrate supplied to the engine; an input shaft rotation speed sensor which detects an input shaft rotation speed of the transmission; torque detection means which detects an engine torque of the engine; and a controller. The controller is programmed to determine, based on the detected vehicle speed and the detected throttle valve opening, whether or not a control region of a torque converter is a converter region wherein control is performed to disengage the lock-up clutch; determine, when the control region of the torque converter is not the converter region, whether or not the control region of the torque converter is a slip control region wherein control is performed to make the lock-up clutch slip, based on the detected input shaft rotation speed of the transmission and the detected engine torque; and command the differential pressure generating device to cause a slip of the lock-up clutch when the control region of the torque converter is the slip control region.

In order to achieve the above object, this invention further provides a lock-up clutch control method for controlling a lock-up clutch provided in a torque converter interposed between an engine and a transmission used with a vehicle. The lock-up clutch control method comprises: detecting a vehicle speed; detecting an opening of a throttle valve which adjusts an air flowrate supplied to the engine; detecting an input shaft rotation speed of the transmission; and detecting an engine torque of the engine. The lock-up clutch control method further comprises: determining, based on the detected vehicle speed and the detected throttle valve opening, whether or not a control region of a torque converter is a converter region wherein control is performed to disengage the lock-up clutch; determining, when the control region of the torque converter is not the converter region, whether or not the control region of the torque converter is a slip control region wherein control is performed to make the lock-up clutch slip, based on the detected input shaft rotation speed of the transmission and the detected engine torque; and commanding a differential pressure generating device to cause a slip of the lock-up clutch, when the control region of the torque converter is the slip control region.

The details as well as other features and advantages of this invention are set forth in the remainder of the specification and are shown in the accompanying drawings.

DESCRIPTION OF THE PREFERRED EMBODIMENTS

Figure 1:
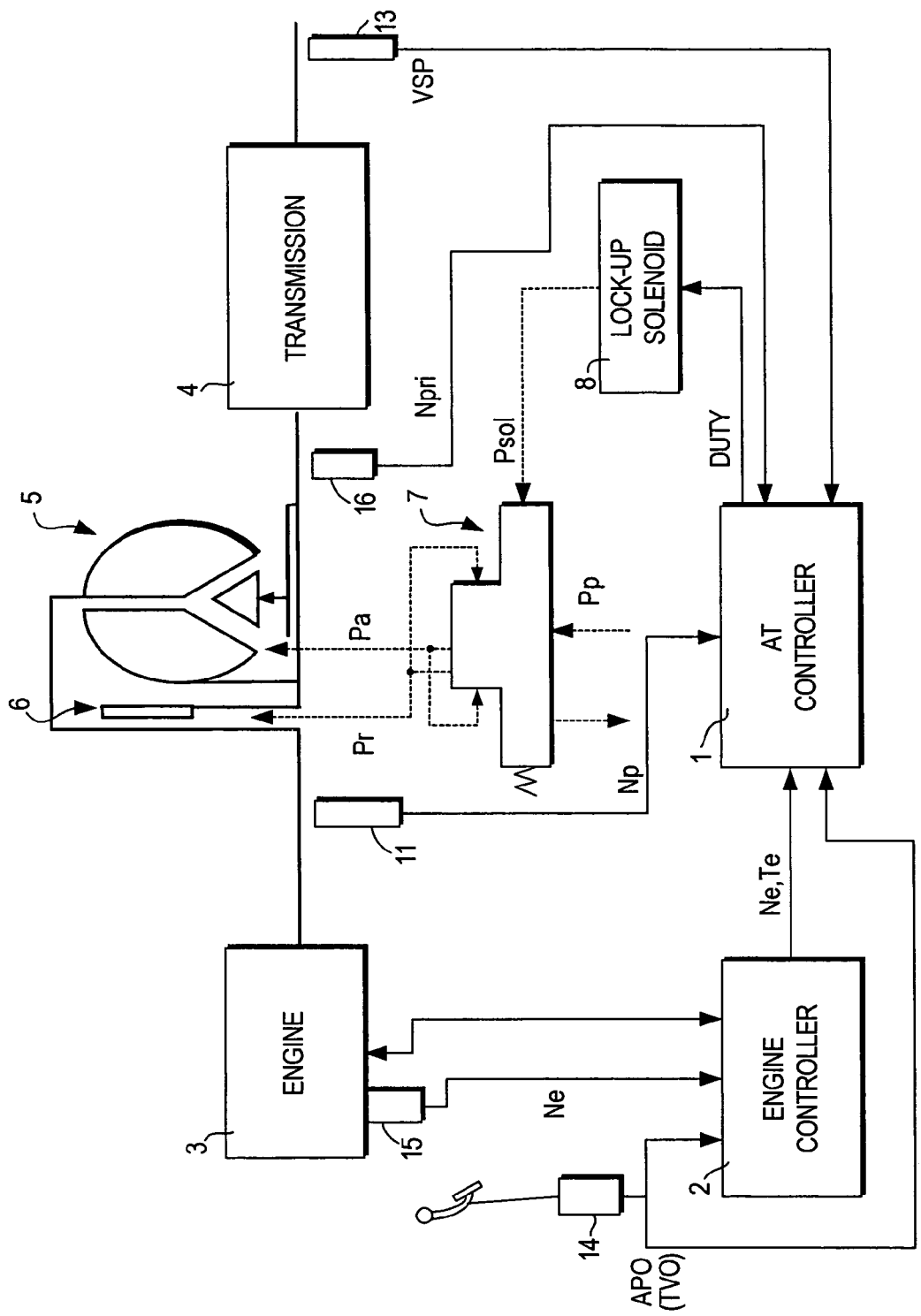
FIG. 1 is a schematic diagram of a vehicle provided with a continuously variable transmission according to one embodiment.

FIG. 1 shows a vehicle in which is mounted an automatic transmission according to this embodiment. An engine 3 is coupled to a torque converter 5 and the torque converter 5 is coupled to the continuously variable transmission (CVT) 4. The torque converter 5 comprises a lock-up clutch 6. The lock-up clutch 6 is selectively brought to a lock-up state (engaged state), a slip state, or an unlock-up state (disengaged state) in accordance with the operational status of the vehicle. The torque converter 5 has incorporated therein the lock-up clutch 6 which is rotated along with a torque converter output element (turbine).

When the lock-up clutch 6 is locked to a torque converter input element (impeller), the torque converter 5 is brought to the lock-up state where the input and output elements are directly coupled to each other.

The lock-up clutch 6 is operated in accordance with a differential pressure Pa–Pr between a torque converter apply pressure Pa and a torque converter release pressure Pr at both sides (the front and rear) of the lock-up clutch 6. When the release pressure Pr is higher than the apply pressure Pa, the lock-up clutch 6 is disengaged, thus direct coupling is not made between the torque converter input and output elements. When the release pressure Pr is much lower than the apply pressure Pa, the lock-up clutch 6 is locked, and direct coupling is made between the torque converter input and output elements.

When locking the lock-up clutch 6, a locking force, i.e. a lock-up capacity, of the lock-up clutch 6 is determined by the differential pressure Pa–Pr. The larger the differential pressure, the more the locking force of the lock-up clutch 6 increases, thereby increasing the lock-up capacity.

The differential pressure Pa–Pr is controlled by a lock-up control valve 7 which is generally known. The lock-up control valve 7 is, for example, disclosed in U.S. Pat. No. 6,860,834 granted to Segawa, et al. on Mar. 1, 2005, U.S. Pat. No. 5,332,073 granted to Iizuka on Jul. 26, 1994, or U.S. Pat. No. 5,752,895 granted to Sugiyama et al. on May 19, 1998.

According to this embodiment, a lock-up solenoid valve 8 uses a pump pressure Pp as the original pressure to create a signal pressure Psol applied to the lock-up control valve 7 in response to a duty signal DUTY. The lock-up control valve 7 supplies the apply pressure Pa and release pressure Pr to the lock-up clutch 6 according to the signal pressure Psol input from the lock-up solenoid valve 8. In the lock-up control valve 7, the apply pressure Pa and the release pressure Pr act to oppose each other. Further, a biasing force of a spring is added in the same direction as the apply pressure Pa, a biasing force of a spring is added in the same direction as the release pressure Pr, and at the same time the signal pressure Psol is applied in the same direction as the release pressure Pr. The lock-up control valve 7 determines the differential pressure Pa–Pr such that these oil pressures and the biasing forces of the springs are balanced. The lock-up solenoid valve 8 and the lock-up control valve 7 constitute a differential pressure generator which generates a differential pressure added to the lock-up clutch.

An AT (automatic transmission) controller 1 constituted by a microcomputer and the like determines the duty signal DUTY in accordance with the operational status of the vehicle, and controls the differential pressure Pa–Pr by sending the duty signal DUTY to the lock-up solenoid valve 8. The AT controller 1 comprises a microcomputer having a central processing unit (CPU), a random access memory (RAM), a read-only memory (ROM), an input/output (I/O) interface, and a timer. The read-only memory (ROM) may be a programmable ROM.

The AT controller 1 receives signals that indicate a running state of the vehicle and an operational state of the driver. For example, these signals are signals that indicate an input shaft rotational speed Npri of the transmission 4, which is detected by an input shaft rotation sensor 16, a pump impeller rotational speed Np detected by an impeller rotation sensor 11, an accelerator pedal stroke APO (or an opening of a throttle valve TVO) detected by an accelerator pedal stroke sensor 14, and a vehicle speed VSP detected by a vehicle speed sensor 13. The input shaft of the transmission 4 corresponds to an output shaft of the torque converter 5, and the rotational speed of the input shaft of the transmission 4 is equivalent to the rotational speed of the output shaft of the torque converter 5. The pump impeller rotational speed Np is equivalent to an input rotational speed (=engine speed Ne) inputted to the torque converter 5. Further, the AT controller 1 receives signals indicative of the engine speed Ne and engine torque Te from an engine controller 2. The AT controller 1 controls locking, release, or slippage of the lock-up clutch 6 by means of these signals. The engine speed Ne is detected by an engine speed sensor 15 and is input to the engine controller 2.

The engine controller 2 comprises a microcomputer having a central processing unit (CPU), a random access memory (RAM), read-only memory (ROM), and an input/output (I/O) interface. The engine controller 2 and the AT controller 1 may be integrated to be a single controller.

Figure 2:
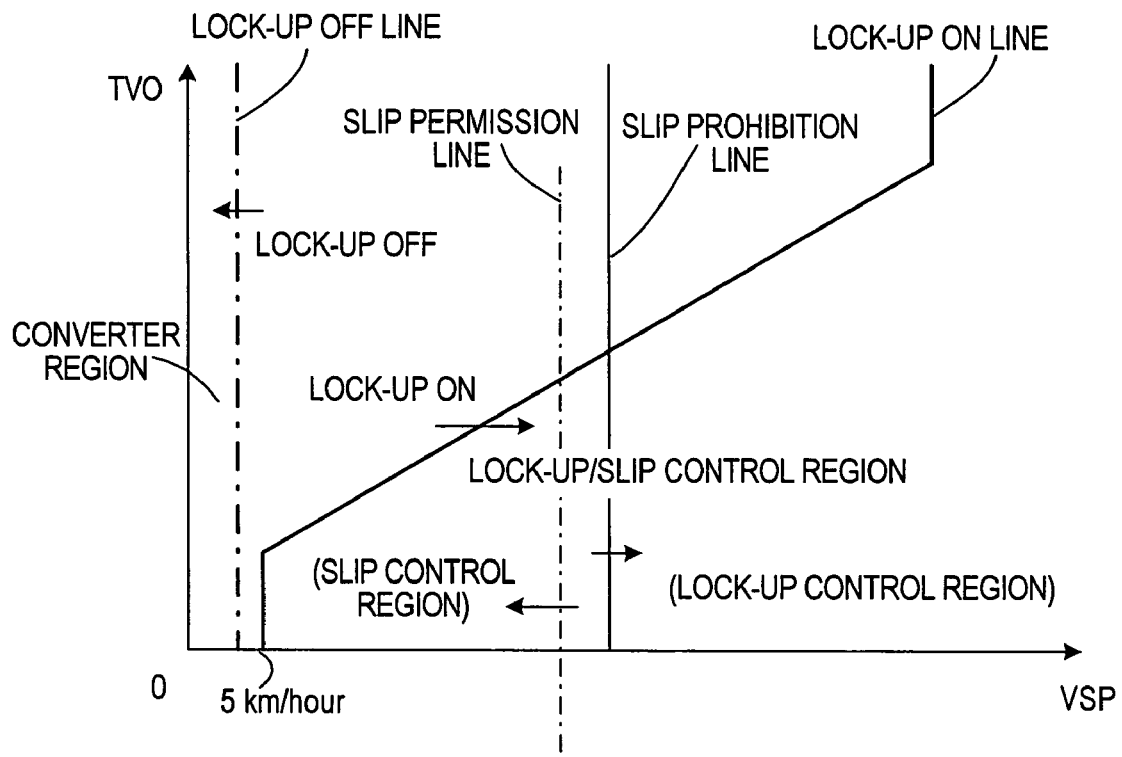
FIG. 2 is an example of a lock-up/slip control region determination map.
Figure 3:
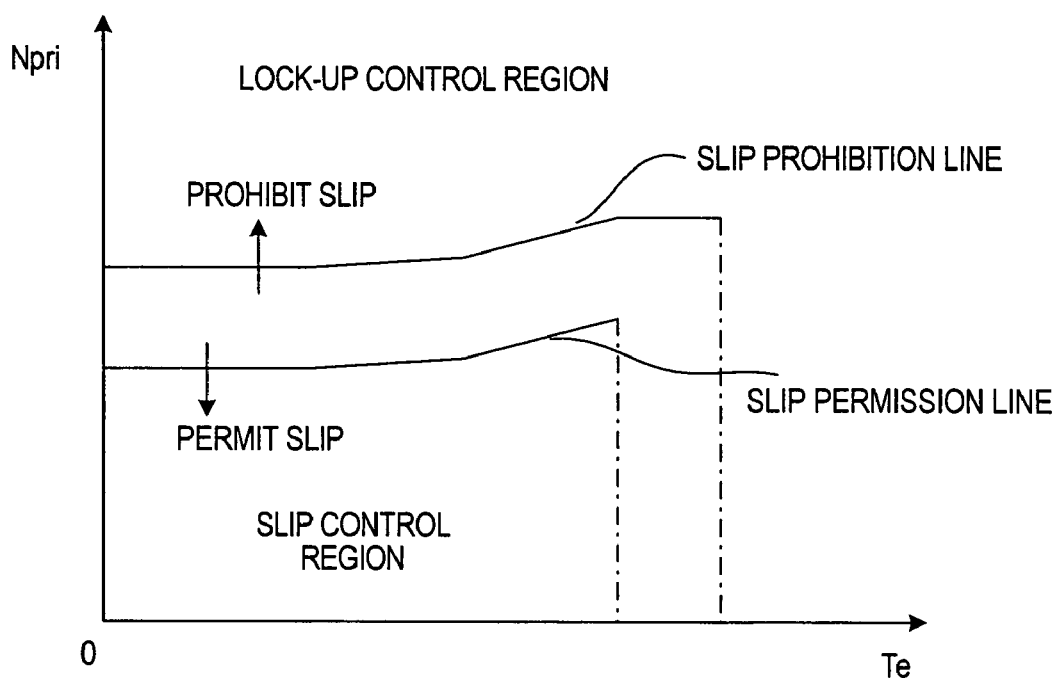
FIG. 3 is an example of a slip control region determination map.
Figures 4, 5:
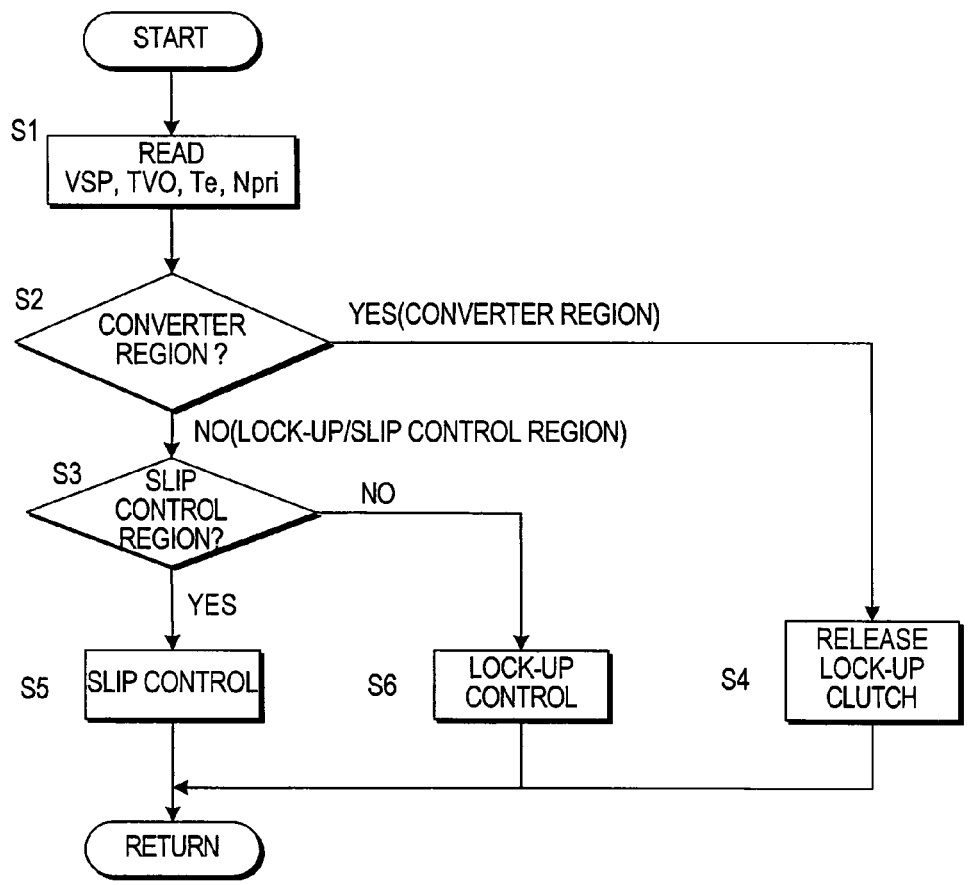
FIG. 4 is a table showing an example of a final region determination.
FIG. 5 is a flow chart showing a lock-up clutch control or a control region determination performed by an controller.
Figure 6:
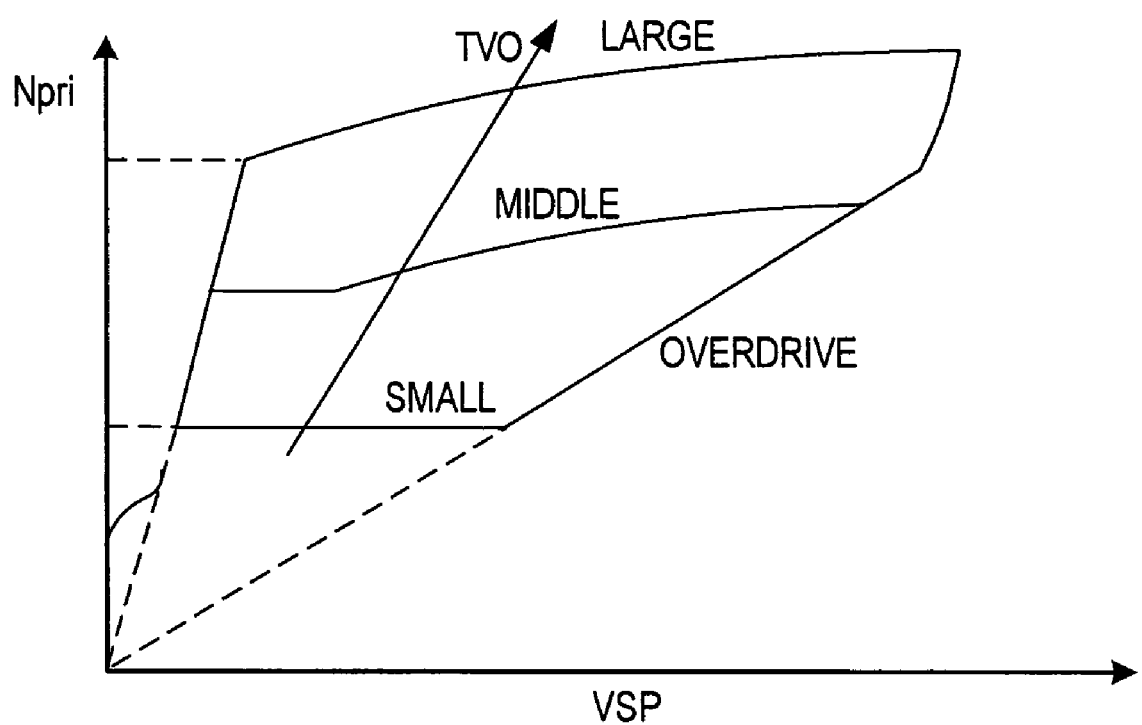
FIG. 6 is a figure showing an example of a shift map of a continuously variable transmission.

FIG. 2 to FIG. 4 are look-up maps for making a control region determination. Specifically, it is determined whether or not the torque converter 5 should be in a converter state, a lock-up state or a slip state based on the running state (in particular, the vehicle speed VSP and throttle valve opening TVO, input shaft rotation speed Npri of the continuously variable transmission and engine torque Te) of the vehicle. During vehicle start, generation of booming noise is prevented by shifting the torque converter 5 into the slip state (where the slip of the lock-up clutch 6 is maintained).

A lock-up/slip control region determination map (first look-up map) shown in FIG. 2, and a slip control region determination map (second look-up map) shown in FIG. 3, are used for control region determination of the lock-up clutch. These look-up maps are stored in a ROM of the AT controller 1. The lock-up/slip control region determination map of FIG. 2 specifies a converter region, and a lock-up/slip control region (i.e., a region which is not the converter region) relative to the throttle valve opening TVO and vehicle speed VSP.

The AT controller 1 refers to the control region determination map of FIG. 2, and determines, on the basis of the throttle valve opening TVO and vehicle speed VSP, whether the control region of the torque converter (expressed differently, the control region of the lock-up clutch) is the converter region or lock-up/slip control region. In FIG. 2, during start acceleration of the vehicle, the converter region is the region on the left-hand side of a lock-up ON line, and the lock-up/slip control region is the region on the right-hand side of the lock-up ON line. The lock-up ON line is the line which divides the converter region and the lock-up/slip control region on starting the vehicle. When the vehicle stops, the converter region is the region on the left-hand side of a lock-up OFF line, and the lock-up/slip control region is the region on the right-hand side of the lock-up OFF line. The lock-up OFF line divides the converter region and the lock-up/slip control region on stopping the vehicle.

In the converter region, the lock-up clutch 6 is disengaged so that the torque converter 5 enters the converter state. The lock-up/slip control region contains the slip control region and the lock-up control region. In the lock-up control region (expressed differently, the full lock-up control region), the lock-up clutch 6 is fully engaged so that the torque converter 5 is in the lock-up state. After the differential pressure Pa–Pr is increased, a high differential pressure Pa–Pr is maintained in the lock-up control region. In the slip control region, the lock-up clutch 6 is controlled to slip.

In the prior art, a slip permission/prohibition line is specified in relation to the throttle valve opening TVO and vehicle speed VSP as in FIG. 2. The slip permission/ prohibition line is set according to the region (i.e., booming noise generation region) where booming noise is generated, and the slip control region overlaps with the region where booming noise is generated. The slip permission/prohibition line shows the boundary where the torque converter 5 is placed in the slip state as a measure against booming noise. Specifically, the slip permission line is set near the maximum of the booming noise generation region (or the maximum of booming noise generation vehicle speed). To prevent hunting during control, the slip prohibition line is set to the high speed side relative to the permission line, generating hysteresis. When the vehicle speed increases, at a certain throttle valve opening TVO, if the vehicle speed VSP becomes larger than the vehicle speed specified by the slip prohibition line, slip control is prohibited and the lock-up clutch 6 is fully engaged. When the vehicle speed decreases, if the vehicle speed VSP becomes smaller than the vehicle speed specified by the slip permission line, slip control is permitted and slip control is performed so that the lock-up clutch 6 may slip. However, the region (therefore, the slip permission/prohibition line) wherein booming noise is generated is not correctly specified only from the throttle valve opening TVO and the vehicle speed VSP.

Unlike the prior art, in this embodiment, the slip control region determination map shown in FIG. 3 defines the slip control region and lock-up control region relative to the input shaft rotation speed Npri (i.e., output rotation speed from the torque converter 5) and engine torque Te. This map is stored in the ROM of the AT controller 1. Here, the slip permission line and slip prohibition line are set according to the booming noise generation region which is determined by an experiment. The slip control region overlaps with the booming noise generation region. To prevent hunting during control, the slip prohibition line is set to the high input shaft rotation speed side relative to the permission line, generating hysteresis. When there is an increase in vehicle speed, at a certain engine torque Te, if the input shaft rotation speed Npri becomes larger than the rotation speed specified by the slip prohibition line, slip control is prohibited and torque converter control enters the lock-up control region where lock-up control is performed. When there is a decrease in vehicle speed, if the input shaft rotation speed Npri becomes smaller than the rotation speed specified by the slip permission line, slip control is permitted and torque converter control enters the slip control region where slip control is performed. Thus, the slip permission/prohibition line divides the lock-up control region and slip control region.

The AT controller 1 refers to the maps of FIG. 2 and FIG. 3, and determines which of the converter region, slip control region and lock-up control region to set according to the vehicle running state. The final control region is determined as shown in the determination table of FIG. 4.

If the result of the control region determination by the lock-up ON/OFF line set by FIG. 2 is the lock-up/slip control region and the control region is on the left side of the slip permission/prohibition line set by FIG. 2, and if the result of the control region determination by the slip permission/prohibition line set by FIG. 3 is the slip control region, the control region which is finally determined is the slip control region. If the result of the control region determination by the lock-up ON/OFF line set by FIG. 2 is the lock-up/slip control region, and if the control region is on the right side of the slip permission/prohibition line set by FIG. 2 or the result of the control region determination by the slip permission/prohibition line set by FIG. 3 is the lock-up control region (above the slip permission/prohibition line), the control region which is finally determined is the lock-up control region.

If the result of the control region determination by the lock-up ON/OFF line set by FIG. 2 is the converter region and the control region is on the left side of the slip permission/prohibition line set by FIG. 2, and if the result of the control region determination by the slip permission/prohibition line set by FIG. 3 is the slip control region, the control region which is finally determined is the converter region. If the result of the control region determination by the lock-up ON/OFF line set by FIG. 2 is the converter region, and if the control region is on the right side of the slip permission/prohibition line set by FIG. 2 or the result of the control region determination by the slip permission/prohibition line is the lock-up control region (above the slip permission/prohibition line), the final determination will be the converter region.

Next, the flow chart of FIG. 5 shows the control region determination routine performed by the AT controller 1 immediately after the start of the vehicle. This routine is repeatedly executed at a predetermined interval (for example, ten milliseconds) by a timer interrupt or the like. The routine may be stored as a program in the ROM of the AT controller 1.

In a step S1, the actual vehicle speed VSP, throttle valve opening TVO, engine torque Te, and input shaft rotation speed Npri of the continuously variable transmission are read.

In a step S2, it is determined whether the control region is located in the converter region or in the lock-up/slip control region by referring to the map of FIG. 2, on the basis of the vehicle speed VSP and throttle valve opening TVO which were read. When the control region is the lock-up/slip control region (i.e., when the control region is not the converter region), the routine proceeds to a step S3, and when the control region is the converter region, the routine proceeds to a step S4.

In the step S4, the lock-up clutch 6 is disengaged, and the torque converter enters the converter state. Engine stall is thereby prevented.

In the step S3, it is determined whether or not the control region is the slip control region, i.e., the booming noise generation region, by referring to the map of FIG. 3. If the control region is the slip control region, the routine proceeds to a step S5. If it is the lock-up control region, the routine proceeds to a step S6.

In the step S5, slip control is performed. The torque converter supply pressure Pa and torque converter release pressure Pr are adjusted by using a duty signal DUTY, and the lock-up clutch 6 is controlled so that a predetermined slip, i.e., a rotation difference, arises between the input/output elements of the lock-up clutch 6. Hence, booming noise is prevented by controlling the torque converter 6 in the slip state.

In the step S6, ordinary lock-up control (full lock-up control) is performed, and the lock-up clutch 6 is fully engaged. In other words, after the differential pressure Pa–Pr is increased by using the duty signal DUTY, a high differential pressure Pa–Pr is maintained.

Thus, in the aforesaid embodiment, the control region of the lock-up clutch is determined using the lock-up/slip control region map which specifies the lock-up/slip control region (or converter region) in relation to the vehicle speed VSP and throttle valve opening TVO, and the slip control region map which specifies the slip control region in relation to the engine torque Te and input shaft rotation speed Npri to the continuously variable transmission. Therefore, the control region of the lock-up clutch can be easily determined.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

The entire contents of Japanese Patent Application P2004-289916 (filed Oct. 1, 2004) are incorporated herein by reference.

What is claimed is:

1. A lock-up clutch control device which controls a lock-up clutch provided in a torque converter interposed between an engine and a transmission used with a vehicle, comprising:
 a differential pressure generating device which engages, causes a slip of or disengages the lock-up clutch by adjusting the differential pressure supplied to the lock-up clutch,
 a vehicle speed sensor which detects a vehicle speed,
 a throttle valve opening sensor which detects an opening of a throttle valve which adjusts an air flowrate supplied to the engine,
 an input shaft rotation speed sensor which detects an input shaft rotation speed of the transmission,
 torque detection means which detects an engine torque of the engine, and
 a controller programmed to:
 determine, based on the detected vehicle speed and the detected throttle valve opening, whether or not a control region of a torque converter is a converter region wherein control is performed to disengage the lock-up clutch,
 when the control region of the torque converter is not the converter region, determine whether or not the control region of the torque converter is a first slip control region, based on the detected vehicle speed,
 when the control region of the torque converter is not the converter region, determine whether or not the control region of the torque converter is a second slip control region wherein control is performed to make the lock-up clutch slip, based on the detected input shaft rotation speed of the transmission and the detection engine torque,
 when the torque converter is in the first slip control region, and the second slip control region, command the differential pressure generating device to cause a slip of the lock-up clutch.

2. The control device as defined in claim 1, wherein a memory of the controller stores a look-up map specifying the converter region in relation to the vehicle speed and the throttle valve opening.

3. The control device as defined in claim 1, wherein a memory of the controller stores a look-up map specifying the slip control region in relation to the input shaft rotation speed of the transmission and engine torque.

4. The control device as defined in claim 1, wherein the slip control region overlaps with a region in which booming noise is generated.

5. A lock-up clutch control device which controls a lock-up clutch provided in a torque converter interposed between an engine and a transmission used with a vehicle, comprising:
 a differential pressure generating means which engages, causes a slip of or disengages the lock-up clutch by adjusting the differential pressure supplied to the lock-up clutch,
 a vehicle speed detecting means for detecting a vehicle speed,
 a throttle valve opening detecting means for detecting an opening of a throttle valve which adjusts an air flowrate supplied to the engine,
 an input shaft rotation speed detecting means for detecting an input shaft rotation speed of the transmission,
 torque detecting means for detecting an engine torque of the engine,
 means for determining, based on the detected vehicle speed and the detected throttle valve opening, whether or not a control region of a torque converter is a converter region wherein control is performed to disengage the lock-up clutch,
 means for determining, when the control region of the torque converter is not the converter region, whether or not the control region of the torque converter is a first slip control region, based on the detected vehicle speed,
 means for determining, when the control region of the torque converter is not the converter region, whether or not the control region of the torque converter is a second slip control region, based on the detected input shaft rotation speed of the transmission and the detected engine torque, and
 means for commanding the differential pressure generating means to cause a slip of the lock-up clutch, when the torque converter is in the first slip control region and the second slip control region.

6. A lock-up clutch control method for controlling a lock-up clutch provided in a torque converter interposed between an engine and a transmission used with a vehicle, the lock-up clutch control method comprising:
 detecting a vehicle speed,
 detecting an opening of a throttle valve which adjusts an air flowrate supplied to the engine,
 detecting an input shaft rotation speed of the transmission,
 detecting an engine torque of the engine,
 determining, based on the detected vehicle speed and the detected throttle valve opening, whether or not a control region of a torque converter is a converter region wherein control is performed to disengage the lock-up clutch,
 determining, when the control region of the torque converter is not the converter region, whether or not the control region of the torque converter is a first slip control region, based on the detected vehicle speed,
 determining, when the control region of the torque converter is not the converter region, whether or not the control region of the torque converter is a second slip control region, based on the detected input shaft rotation speed of the transmission and the detected engine torque, commanding a differential pressure generating device, which engages, causes a slip of or disengages the lock-up clutch by adjusting the differential pressure supplied to the lock-up clutch, to cause a slip of the lock-up clutch, when the torque converter is in the first slip control region and the second slip control region.

* * * * *